UNITED STATES PATENT OFFICE.

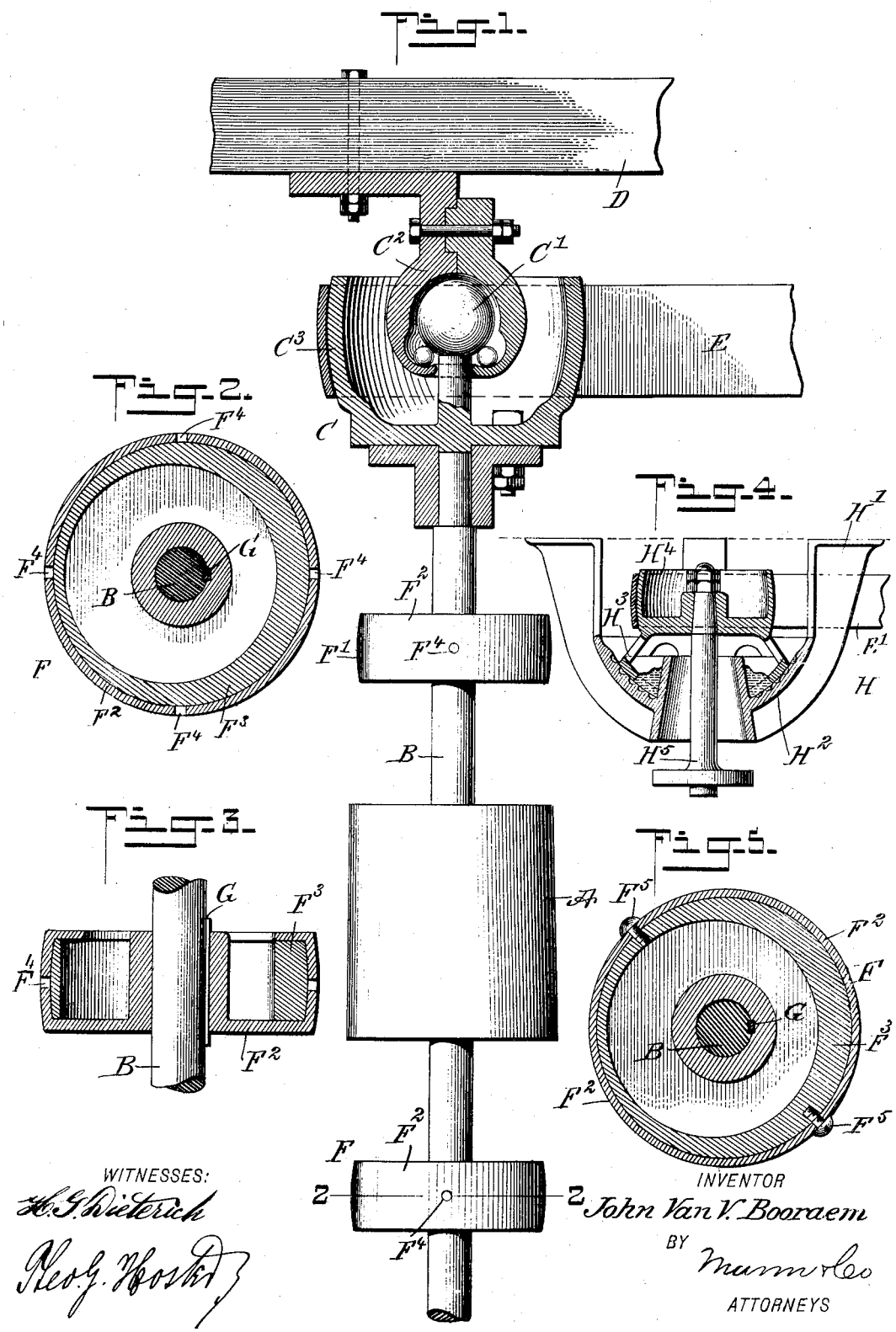

JOHN VAN VORST BOORAEM, OF NEW YORK, N. Y.

MEANS FOR AUTOMATICALLY BALANCING ROTATING MASSES.

No. 829,251.     Specification of Letters Patent.     Patented Aug. 21, 1906.

Application filed January 12, 1906. Serial No. 295,746.

*To all whom it may concern:*

Be it known that I, JOHN VAN VORST BOORAEM, a citizen of the United States, and a resident of the city of New York, borough of Brooklyn, in the county of Kings and State of New York, have invented a new and Improved Means for Automatically Balancing Rotating Masses, of which the following is a full, clear, and exact description.

The object of the invention is to provide a new and improved means for automatically balancing rotating masses, such as are found in turbines and other machines and devices, the arrangement being such that an increased speed with increased efficiency is obtained by bringing the center of gravity of the rotating mass to coincide with the center of revolution of the mass to allow of running the mass at very high speed without causing undue friction and consequent wear, to avoid shocks and jars and consequent loss of energy, and to prevent dismemberment of the mass.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement, parts being in section. Fig. 2 is an enlarged sectional plan view of one of the counterbalances, the section being on the line 2 2 of Fig. 1. Fig. 3 is a sectional side elevation of the same. Fig. 4 is a sectional side elevation of a modified form of the universal suspension for the rotating mass, and Fig. 5 is a sectional plan view of a modified form of counterbalance.

Rotating pieces of machinery are generally formed of several or many parts or appendages. Unless all parts opposed in position are of precisely the same weight the system is unbalanced. In practice the condition of a perfect balance among these various parts is seldom reached. Trifling differences become important factors when the number of revolutions is largely increased, and while the distance from the center of revolution is a controlling factor even an unbalanced key on the shaft cannot be overlooked.

Under rapid motion in fixed bearings unbalanced bodies absorb much energy, which tends to impair their running conditions by increasing the wear, &c. In extreme cases shocks and oscillations are set up, necessitating modulations of speed if danger of rupture is to be avoided and durability sought. The immediate cause of the unbalanced condition is that the center of gravity of the revolving parts of the apparatus does not coincide with their center of revolution. As is well known, all masses in rotation seek under the natural law which controls them to revolve upon their center of gravity. If this is not permitted, owing to the use of faulty methods, and the body is forced to revolve upon its fixed journals, which do not coincide with the former, shocks, jars, and loss of energy follow. With my improvement, presently to be described in detail, the above-mentioned defects are completely overcome by the use of a counterbalance member capable of shifting under centrifugal force until the center of gravity of the entire rotating mass coincides with the mechanical center of revolution of the mass.

It is assumed that the body A and the shaft B, as shown in Fig. 1, represent the entire revolving portion of the machine to be balanced, the body A being secured to and rotating with the shaft B and the upper end of the latter being connected to a universal suspension C of the ball-and-socket type and having its rotating member C' in the form of a ball rotating in the socket $C^2$, attached to an overhead beam D. The rotating member C' supports the shaft B and is provided with a pulley $C^3$, connected by a belt E with other machinery for imparting a rotary motion to the rotating member C', and consequently to the shaft B, carrying the body A. On the shaft B below and above the body A are arranged counterbalances F and F', each formed of a containing member $F^2$ and a shiftable member $F^3$, of which the containing member $F^2$ is in the form of a vessel having its hub secured to the shaft B by a key G or other device. The shiftable member $F^3$ is in the form of a semifluid, preferably a plastic material capable of hardening—for instance, a mixture of hydraulic cement, water, and sand. Now immediately previous to rotating the shaft B the semifluid member $F^3$ is poured into the containing member $F^2$, and then the shaft B is rotated at its suspension C, so that the semifluid member $F^3$ is subjected to the action of centrifugal force, and consequently the member F³ moves against the rim of the containing member F² and assumes an eccentric form in case the entire rotating mass or system is unbalanced. Now by the member F³ gradually assuming this eccentric shape it gradually counterbalances the unbalanced rotating mass, so that the center of gravity of the rotating mass finally coincides with the mechanical center of revolution of the rotating mass. The latter is kept in rotation until the member F³, owing to its plastic composition, hardens in the container F², so that the balance of the entire rotating mass is maintained even after the rotation ceases—that is, is made permanent. Various means may be employed for holding the member F³ interlocked with the containing member F² after the member has hardened. For instance, as shown in Figs. 1, 2, and 3, the rim of the container F² may be provided at equidistant points with apertures or pockets F⁴, into which the material forming the member F³ can penetrate, and thus lock the member F³ in place on the member F².

As shown in Fig. 5, a pair of stay-bolts F⁵ are secured to the rim of the container F² at diametrically opposite points to project into the plastic material forming the member F³, so that when the material hardens it is locked in place by the stay-bolts F⁵. The construction of the suspension C may also be varied, especially when it is desired to balance very heavy masses. For instance, as shown in Fig. 4, the suspension H is provided with a hanger H', adapted to be fastened to an overhead support and provided with a spherical bottom H², adapted to contain oil or other liquid, and a spherical member H³, carrying a pulley H⁴, connected by belt E' with other machinery for rotating the member H³ on the spherical bottom H². The pulley H⁴ supports a hanger H⁵, to which the shaft B is axially attached to rotate the shaft B, its body A, and the counterbalances F and F' whenever the pulley H⁴ is rotated by the belt E'. In some cases only one of the counterbalances F or F' may be employed, but when a great perfection of balance is required—for high speed, for instance—two counterbalances F and F', located below and above the body A, are necessary. It is obvious that when the axis of unbalanced weight lies at a certain point of the body A it cannot generally be counterbalanced within the same plane of revolution, owing to complications arising with its functions. If the counterbalance F only is desired, for instance, then there must arise an unbalanced moment owing to the distance at which the points lie apart. This difference, however, can be removed by the use of a second counterbalance F', so that the unbalanced moments of each counterbalance neutralize each other. The resulting balance can then be as accurate as if the two counterbalances were applied directly in the plane of movement.

In the foregoing description use is made of the term "entire rotating mass," which includes all the parts rotating—that is, the rotating members of the machine as well as the members of the counterbalancing devices, and it is evident that if any one of the parts of the entire rotating mass or system is out of balance the entire rotating mass is unbalanced. As each part is keyed or otherwise fastened to the shaft B, it is strained eccentrically, thus adding a geometrical displacement to other mechanical ones that may exist. It is understood that by rotating a suspended unbalanced mass without the use of the counterbalances F and F' the lower end of the axis of rotation of the mass describes a circle, owing to the fact that the centrifugal force of the rotating unbalanced mass causes a bodily movement thereof in a circle. In other words, the center of gravity of the rotating mass does not coincide with the center of revolution. It is further understood that when balancing the supposedly unbalanced mass as above described the counterbalance of the movable member F³ gradually increases as the speed of the entire rotating mass increases, and the circle in which the latter travels becomes gradually less and less until the center of gravity of the entire rotating mass coincides with the center of revolution of the entire rotating mass. Thus by the arrangement described a visible means is provided for recognizing the arrival of the desired result.

Having thus described my invention, I claim as new and desire to secure by Letters Patent—

1. Means for balancing rotating masses, comprising a counterbalance rotating with the said mass and having a member capable of shifting under the influence of centrifugal force until the center of gravity of the rotating mass coincides with the center of rotation of the mass, said member being provided with fixing means whereby to maintain it in such position of coincidence.

2. Means for balancing rotating masses, comprising a plastic counterbalance rotating with the mass and shifting its center of gravity under the influence of centrifugal force whereby to coincide with the center of gravity of the mass, and capable of hardening and becoming fixed whereby to maintain the coincidence of said centers.

3. Means for automatically balancing rotating masses, comprising an axial universal suspension for the rotating mass, and a counterbalance rotating with the said mass a distance from the said suspension, the said counterbalance having a member of a plastic material shifting under the influence of centrifugal force until the center of gravity of the mass coincides with the center of rotation of the mass and capable of hardening and becoming fixed to maintain the coincidence of the said centers.

4. Means for automatically balancing rotating masses, comprising an axial universal suspension for the rotating mass, means for rotating the mass at the said suspension, and a counterbalance rotating with the said mass a distance from the said suspension, the said counterbalance having a member of a plastic material shifting under the influence of centrifugal force until the center of gravity of the mass coincides with the center of rotation of the mass and capable of hardening and becoming fixed to maintain the coincidence of the said centers.

5. Means for automatically balancing rotating masses, comprising a universal suspension for the upper end of the mass, means for rotating the said mass at the suspension, and counterbalances attached to the said mass, each counterbalance comprising a containing member attached to the mass and a member of plastic material capable of hardening and contained in the said containing member, to shift under the influence of centrifugal force until the center of gravity of the mass coincides with the center of revolution of the mass.

6. Means for automatically balancing rotating masses, comprising a universal suspension for the upper end of the mass, means for rotating the said mass at the suspension, counterbalances attached to the said mass at different points, each counterbalance comprising a containing member attached to the mass and a member of plastic material capable of hardening and contained in the said containing member, to shift under the influence of centrifugal force until the center of gravity of the mass coincides with the center of revolution of the mass, and means for fixing the said counterbalance member of plastic material to its containing member, to maintain the balance.

7. Means for automatically balancing rotating masses, comprising a universal suspension for the upper end of the mass, means for rotating the said mass at the suspension, and counterbalances attached to the said mass at different points, each counterbalance having a member capable of shifting under the influence of centrifugal force until the center of gravity of the said mass coincides with the center of rotation of the mass, the said shiftable counterbalance member being of a plastic material capable of hardening and interlocking with its containing balance member to maintain the obtained balance.

8. The herein-described method for counterbalancing a rotating unbalanced mass, consisting in subjecting a plastic material capable of hardening and contained in a receptacle rotating with the said mass to the action of centrifugal force, to balance the said unbalanced mass so that the latter's center of gravity coincides with the center of rotation of the mass.

9. The herein-described method for counterbalancing a rotating unbalanced mass, consisting in subjecting a plastic material capable of hardening and contained in a receptacle rotating with the said mass to the action of centrifugal force, to balance the said unbalanced mass so that the latter's center of gravity coincides with the center of rotation of the mass, the said material, on hardening, forming a permanent counterbalance for the unbalanced mass.

10. The herein-described method for balancing a rotating unbalanced mass, consisting in subjecting a plastic material capable of hardening to rotation with the said mass, to shift the material under the influence of centrifugal force to balance the said unbalanced mass, so that the center of gravity of the rotating mass coincides with the center of rotation of the mass.

11. The herein-described method for permanently counterbalancing a rotating unbalanced mass, consisting in rotating a confined plastic material capable of hardening with the said mass, to thus subject the plastic material to the action of centrifugal force and thereby cause the material to shift and balance the unbalanced mass, so that the center of gravity of the latter coincides with the center of rotation of the mass, the said material, on hardening, forming a permanent balance for the mass.

In testimony whereof I have signed my name to this specification in the presence of two subscribing witnesses.

JOHN VAN VORST BOORAEM.

Witnesses:
    ELIZABETH BOORAEM,
    ALFRED W. BOORAEM.